US012039893B2

(12) United States Patent
Zappa

(10) Patent No.: US 12,039,893 B2
(45) Date of Patent: Jul. 16, 2024

(54) VISUAL IMAGE DISPLAY BOARD AND METHOD OF MANUFACTURING THE SAME

(71) Applicant: Richard Zappa, North Bellmore, NY (US)

(72) Inventor: Richard Zappa, North Bellmore, NY (US)

( * ) Notice: Subject to any disclaimer, the term of this patent is extended or adjusted under 35 U.S.C. 154(b) by 0 days.

(21) Appl. No.: 18/243,121

(22) Filed: Sep. 7, 2023

(65) Prior Publication Data

US 2023/0419864 A1 Dec. 28, 2023

Related U.S. Application Data

(63) Continuation of application No. 17/229,152, filed on Apr. 13, 2021, now Pat. No. 11,790,807, which is a continuation of application No. 16/672,903, filed on Nov. 4, 2019, now Pat. No. 10,977,963, which is a continuation of application No. 15/654,810, filed on Jul. 20, 2017, now Pat. No. 10,467,928.

(60) Provisional application No. 62/366,552, filed on Jul. 25, 2016.

(51) Int. Cl.

| | |
|---|---|
| ***G09F 1/08*** | (2006.01) |
| ***B42D 15/04*** | (2006.01) |
| ***G09F 1/06*** | (2006.01) |
| ***G09F 1/10*** | (2006.01) |
| ***G09F 7/18*** | (2006.01) |
| ***G09F 15/00*** | (2006.01) |

(52) U.S. Cl.

CPC ............. *G09F 1/08* (2013.01); *B42D 15/042* (2013.01); *G09F 1/06* (2013.01); *G09F 1/10* (2013.01); *G09F 7/18* (2013.01); *G09F 15/0056* (2013.01)

(58) Field of Classification Search

CPC ..... G09F 1/08; G09F 1/06; G09F 1/10; G09F 7/18; G09F 15/0006; B42D 15/042

See application file for complete search history.

(56) References Cited

U.S. PATENT DOCUMENTS 3,879,874 A * 4/1975 Broussard, Sr. ........ B44C 3/025 40/768
3,897,645 A * 8/1975 Scheyer .................... B44F 7/00 40/800
4,530,863 A * 7/1985 Seeger ...................... B44C 3/12 40/800
6,129,969 A * 10/2000 Pynenburg ................ B32B 3/08 40/596
7,013,591 B2 * 3/2006 Lee ......................... G09F 13/00 40/124.191

(Continued)

*Primary Examiner* — Gary C Hoge

(74) *Attorney, Agent, or Firm* — Shore IP Group, PLLC; Sean R. Wilsusen

(57) ABSTRACT

A visual image display board according to an exemplary embodiment of the present invention includes a horizontal base and a display board. The display board includes a front surface, a back surface, a left side, a right side, an upper side and a bottom side. The bottom side of the display board is coupled to the horizontal base. An adhesive layer is disposed between the bottom side of the display board and the horizontal base. The adhesive layer couples the display board to the horizontal base. One or more photographs are conformally disposed on the front surface of the display board. A shape of the one or more photographs substantially corresponds with a shape of the display board.

10 Claims, 15 Drawing Sheets

(56) References Cited

U.S. PATENT DOCUMENTS

| | | | | |
|---|---|---|---|---|
| D713,886 | S * | 9/2014 | Winemiller | D20/30 |
| 9,747,821 | B2 * | 8/2017 | Gastelum | G09F 9/00 |
| 10,467,928 | B2 | 11/2019 | Zappa et al. | |
| 10,977,963 | B2 | 4/2021 | Zappa | |

* cited by examiner

1400

VISUAL IMAGE DISPLAY BOARD AND METHOD OF MANUFACTURING THE SAME

CROSS-REFERENCE TO RELATED APPLICATION

The present application is a continuation of U.S. patent application Ser. No. 17/229,152, filed on Apr. 13, 2021, which is a continuation of U.S. patent application Ser. No. 16/672,903, filed on Nov. 4, 2019, now U.S. Pat. No. 10,977,963, which is a continuation of U.S. patent application Ser. No. 15/654,810, filed on Jul. 20, 2017, now U.S. Pat. No. 10,467,928, which claims priority to, and the benefit of, U.S. Provisional Patent Application No. 62/366,552, filed on Jul. 25, 2016. The entire contents of each of the foregoing applications are hereby incorporated by reference herein.

FIELD OF THE INVENTION

The present invention relates to a visual image display board, and more particularly to a method of manufacturing the visual image display board. One or more exemplary embodiments of the present invention provide a multi-dimensional visual image display board and a method of manufacturing the multi-dimensional visual image display board.

SUMMARY

Exemplary embodiments of the present invention provide a visual image display board including a horizontal base and a display board. The display board includes a front surface, a back surface, a left side, a right side, an upper side and a bottom side. The bottom side of the display board is coupled to the horizontal base. An adhesive layer is disposed between the bottom side of the display board and the horizontal base. The adhesive layer couples the display board to the horizontal base. One or more photographs are conformally disposed on the front surface of the display board. A shape of the one or more photographs substantially corresponds with a shape of the display board.

According to an exemplary embodiment of the present invention, a width of the left, side, the right side, the upper side and the bottom side of the display board may be from about 1 cm to about 20 cm.

According to an exemplary embodiment of the present invention, the one or more photographs may include one or more sports figures.

According to an exemplary embodiment of the present invention, the visual image display board may include one or more sports card display cases coupled to the horizontal base.

According to an exemplary embodiment of the present invention, the one or more photographs might not overlap any of the left, side, the right side, the upper side and the bottom side of the display board.

According to an exemplary embodiment of the present invention, the one or more photographs may be attached to the front surface of the display board with an adhesive.

According to an exemplary embodiment of the present invention, the adhesive may be a spray adhesive configured to adhere to any of fabric, felt, cork and fibrous glass, flexible foam, latex, urethane, rigid foam, leather, rubber, EPDM rubber, metal, plastic, PVC, acrylic, nylon, glass, ceramic, gypsum board, fiberglass, masonry, paper, cardboard, polyolefins, elastomers, wood, hardboard, and vinyl.

Exemplary embodiments of the present invention provide a visual image display board including a horizontal base and a display board. The display board includes a first front surface, a first back surface, a first left side, a first right side, a first upper side and a first bottom side. The first bottom side of the display board is coupled to the horizontal base. An adhesive layer is disposed between the first bottom side of the display board and the horizontal base. The adhesive layer couples the display board to the horizontal base. A disarticulated display board member is disposed in front of the first front surface of the display board. The disarticulated display board member is formed of a separated portion of the display board.

According to an exemplary embodiment of the present invention, a first portion of a visual image may be displayed on the display board. A second portion of the visual image may be displayed on the disarticulated display board member.

According to an exemplary embodiment of the present invention, the visual image display board may include one or more support brackets coupled to the first back surface of the display board and a second back surface of the disarticulated display board member.

According to an exemplary embodiment of the present invention, a width of the left, side, the right side, the upper side and the bottom side of the display board may be from about 1 cm to about 20 cm.

According to an exemplary embodiment of the present invention, the adhesive may be a spray adhesive configured to adhere to any of fabric, felt, cork and fibrous glass, flexible foam, latex, urethane, rigid foam, leather, rubber, EPDM rubber, metal, plastic, PVC, acrylic, nylon, glass, ceramic, gypsum board, fiberglass, masonry, paper, cardboard, polyolefins, elastomers, wood, hardboard, and vinyl.

According to an exemplary embodiment of the present invention, the first portion of the visual image might not overlap the first left side, the first right side, the first upper side or the first bottom side of the display board. The second portion of the visual image might not overlap a second left side, a second right side, a second upper side or a second bottom side of the disarticulated display board member.

Exemplary embodiments of the present invention provide a method of manufacturing a visual image display board including providing a horizontal base and a display board base panel; coating substantially an entire front surface of the display board base panel with a multipurpose spray adhesive; adhering one or more photographs to the coated front surface of the display board base panel; cutting the display board base panel into a shape corresponding with the visual image; and coupling the display board base panel to the horizontal base.

According to an exemplary embodiment of the present invention, the method of manufacturing the visual image display board may include removing a portion of the display board base panel including a portion of the adhered photograph; moving the removed portion of the display board base panel including the portion of the adhered photograph forward of the display board base panel, and attaching the removed portion of the display board base panel including the portion of the adhered photograph to the display board base panel.

According to an exemplary embodiment of the present invention, the multipurpose spray adhesive may be configured to adhere to any of fabric, felt, cork and fibrous glass, flexible foam, latex, urethane, rigid foam, leather, rubber, EPDM rubber, metal, plastic, PVC, acrylic, nylon, glass, ceramic, gypsum board, fiberglass, masonry, paper, cardboard, polyolefins, elastomers, wood, hardboard, and vinyl.

According to an exemplary embodiment of the present invention, the method of manufacturing the visual image display board may include coupling one or more sports card display cases to the horizontal base According to an exemplary embodiment of the present invention, the one or more photographs might not overlap any of a left, side, a right side, an upper side and a bottom side of the cut out display board base panel.

According to an exemplary embodiment of the present invention, the display board base panel may be coupled to the horizontal base using an adhesive.

According to an exemplary embodiment of the present invention, the adhesive may be configured to adhere to any of fabric, felt, cork and fibrous glass, flexible foam, latex, urethane, rigid foam, leather, rubber, EPDM rubber, metal, plastic, PVC, acrylic, nylon, glass, ceramic, gypsum board, fiberglass, masonry, paper, cardboard, polyolefins, elastomers, wood, hardboard, and vinyl.

BRIEF DESCRIPTION OF THE FIGURES

The above and other features of the present invention will become more apparent by describing in detail exemplary embodiments thereof, with reference to the accompanying drawings, in which.

DETAILED DESCRIPTION

Figure 1:
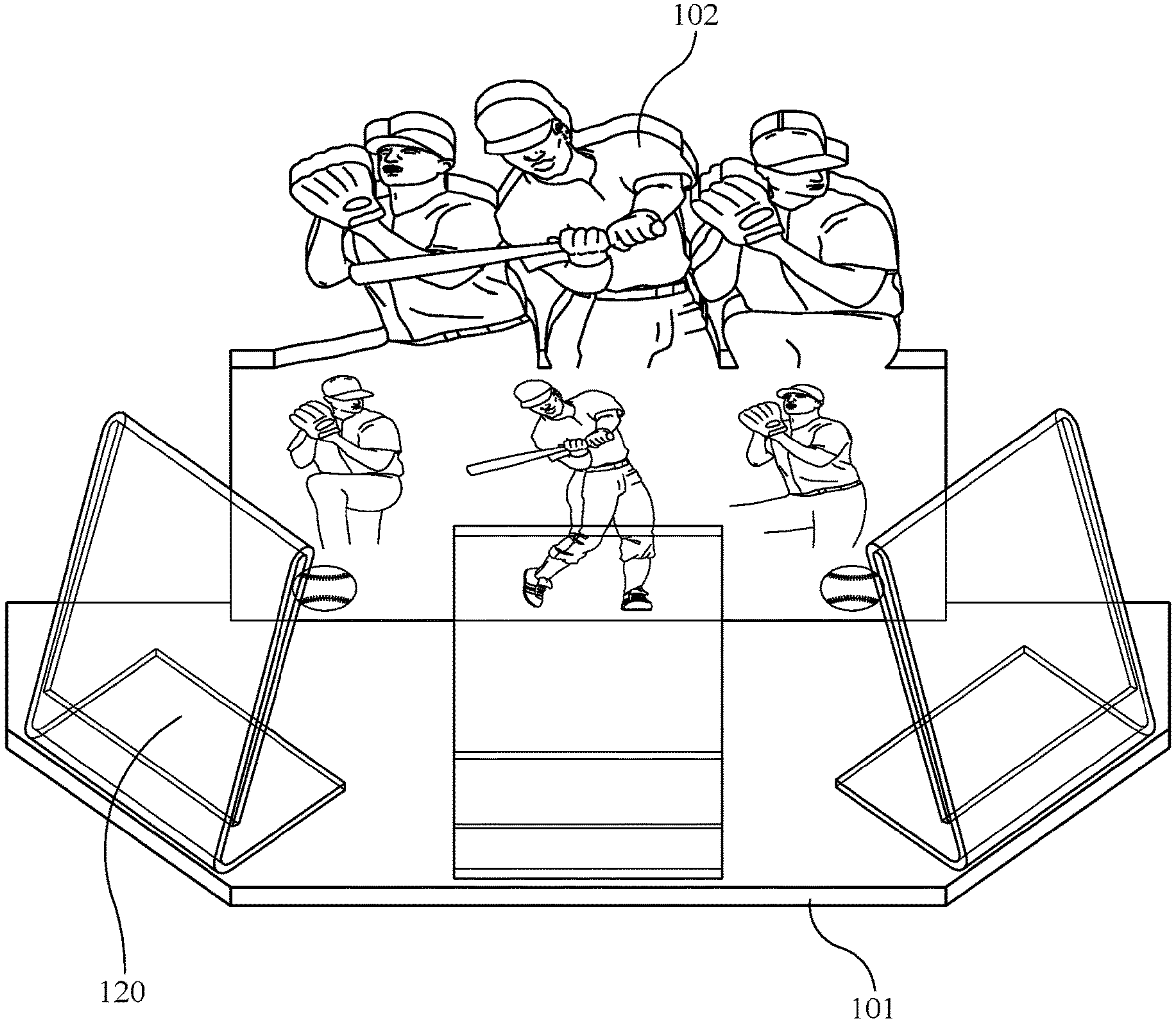
FIG. 1 illustrates a front view of a visual image display board according to an exemplary embodiment of the present invention.

It will be understood that the terms "first," "second," "third," etc. are used herein to distinguish one element from another, and the elements are not limited by these terms. Thus, a "first" element in an exemplary embodiment may be described as a "second" element in another exemplary embodiment.

Exemplary embodiments of the present invention will be described more fully hereinafter with reference to the accompanying drawings. Like reference numerals may refer to like elements throughout the specification and drawings.

Figure 2:
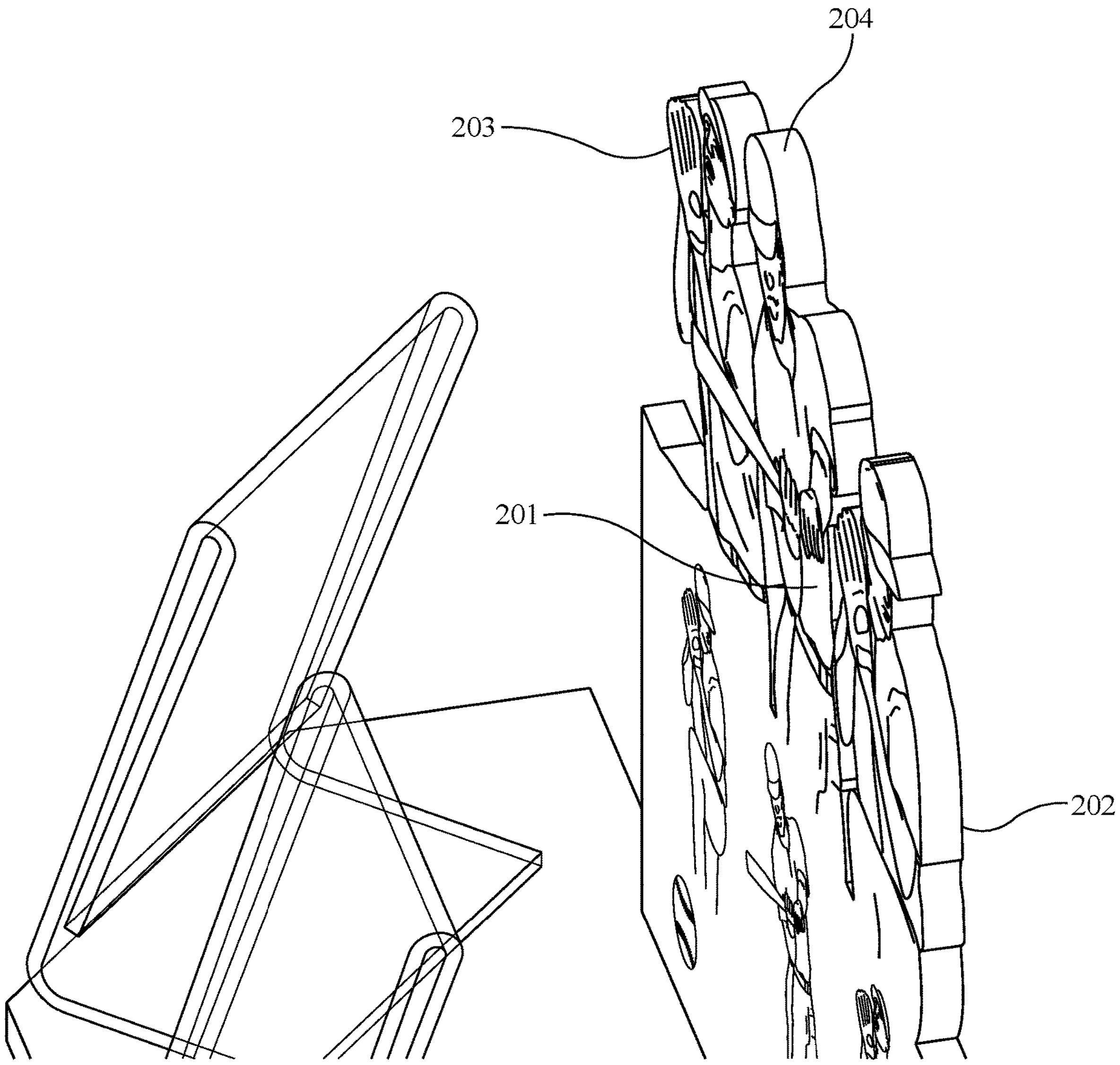
FIG. 2 illustrates a side angled view of a visual image display board according to an exemplary embodiment of the present invention.
Figure 3:
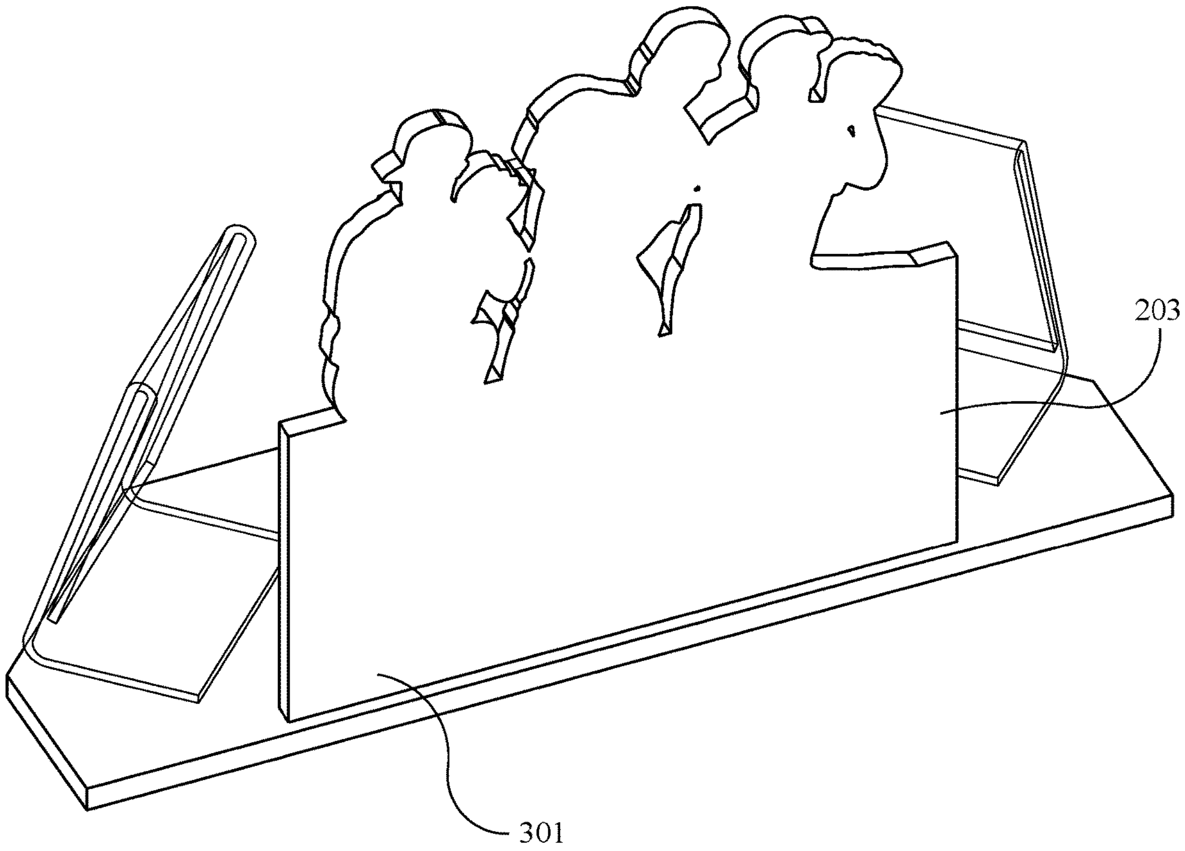
FIG. 3 illustrates a rear angled view of a visual image display board according to an exemplary embodiment of the present invention.
Figure 4:
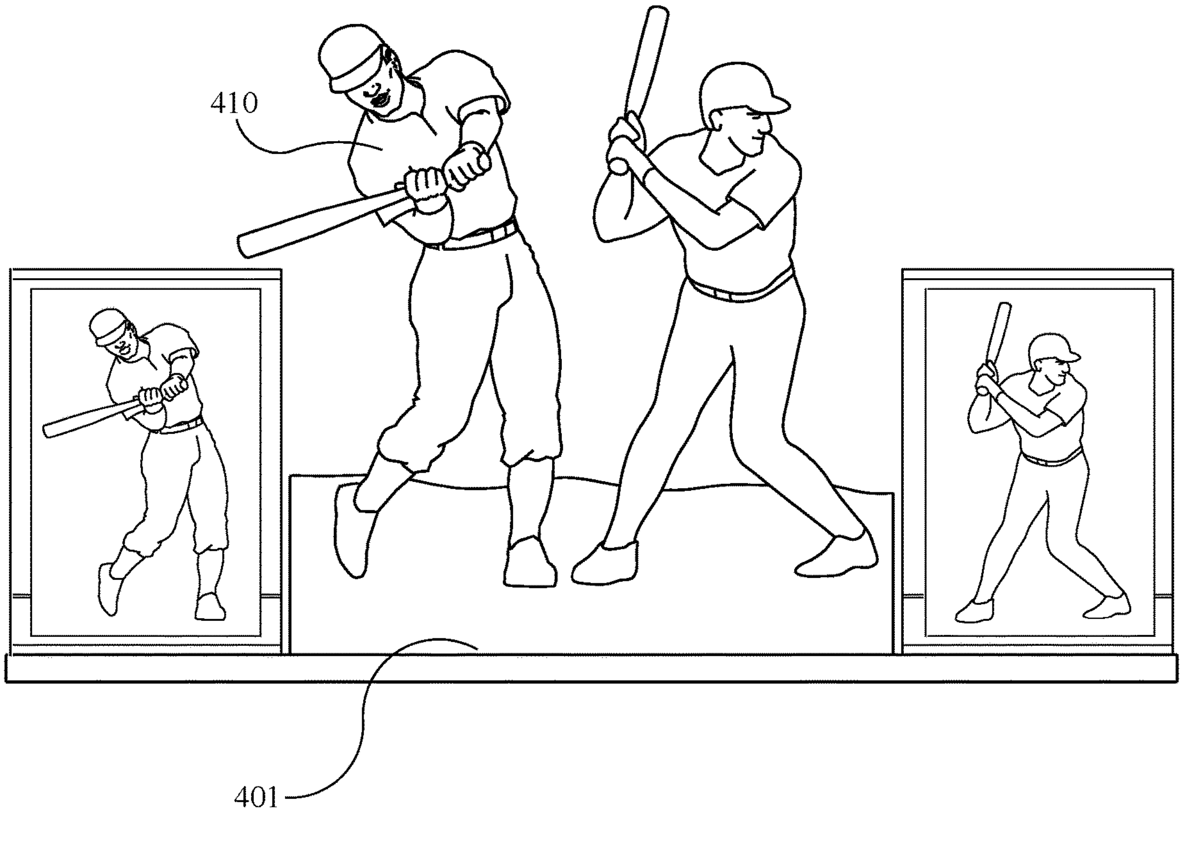
FIG. 4 illustrates a front view of a visual image display board according to an exemplary embodiment of the present invention.
Figure 5:
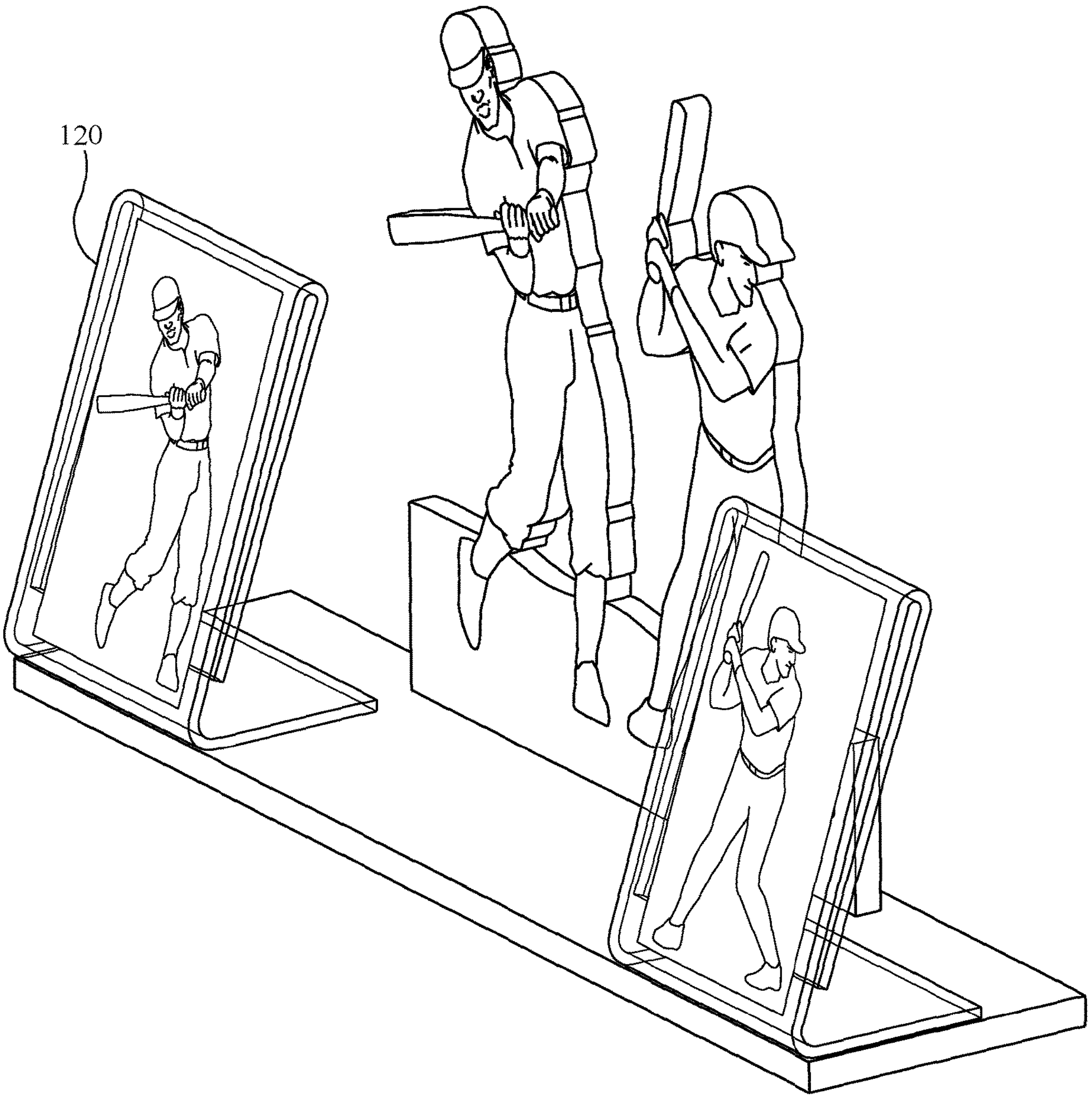
FIG. 5 illustrates a side angled view of a visual image display board according to an exemplary embodiment of the present invention.
Figure 6:
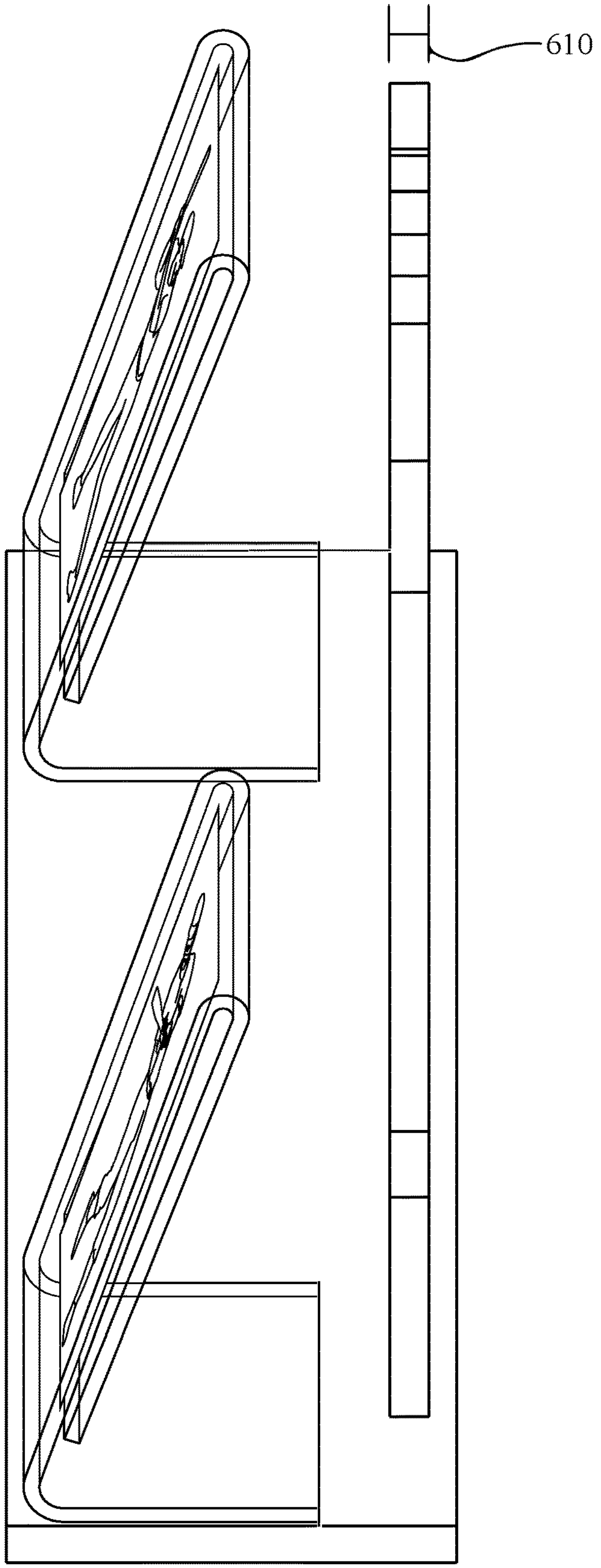
FIG. 6 illustrates a side view of a visual image display board according to an exemplary embodiment of the present invention.
Figure 7:
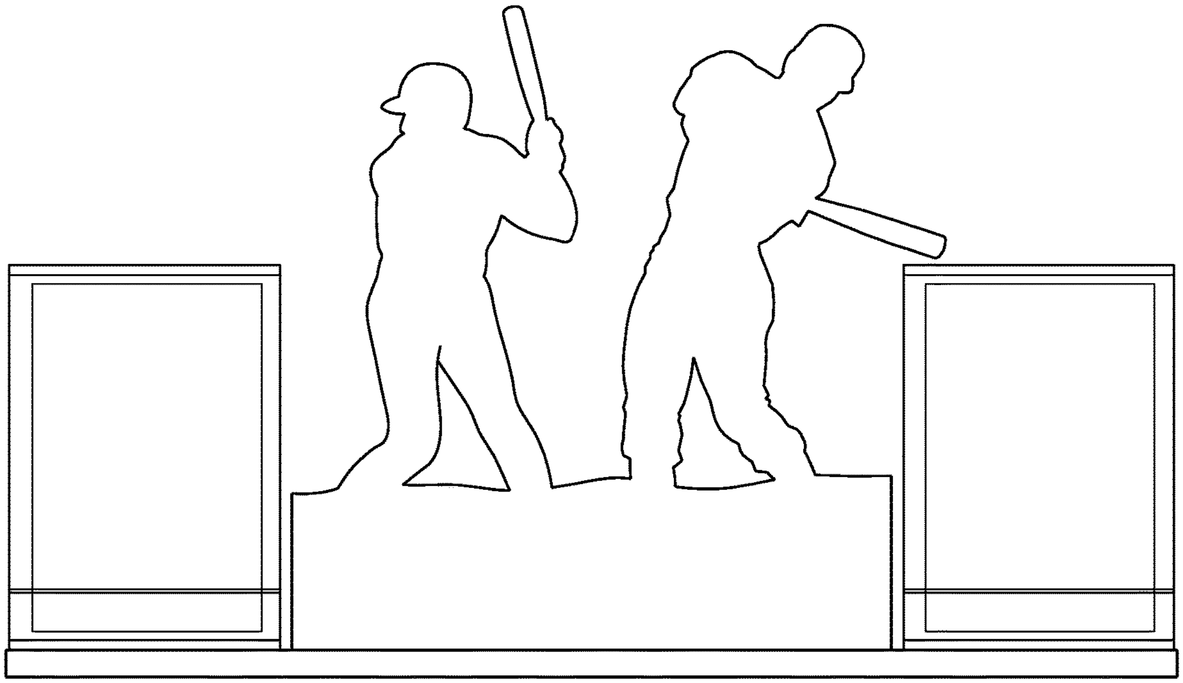
FIG. 7 illustrates rear view of a visual image display board according to an exemplary embodiment of the present invention.

FIG. 1 illustrates a front view of a visual image display board according to an exemplary embodiment of the present invention. FIG. 2 illustrates a side angled view of a visual image display board according to an exemplary embodiment of the present invention. FIG. 3 illustrates a rear angled view of a visual image display board according to an exemplary embodiment of the present invention. FIG. 4 illustrates a front view of a visual image display board according to an exemplary embodiment of the present invention. FIG. 5 illustrates a side angled view of a visual image display board according to an exemplary embodiment of the present invention. FIG. 6 illustrates a side view of a visual image display board according to an exemplary embodiment of the present invention. FIG. 7 illustrates rear view of a visual image display board according to an exemplary embodiment of the present invention.

Referring to FIGS. 1 to 7, exemplary embodiments of the present invention provide a visual image display board including a horizontal base 101 and a display board 102. The display board includes a front surface 201, a back surface 302, a left side 202, a right side 203, an upper side 204 and a bottom side 301. The bottom side 301 of the display board 102 is coupled to the horizontal base 101. An adhesive layer 401 is disposed between the bottom side 301 of the display board 102 and the horizontal base 101. The adhesive layer 401 couples the display board 102 to the horizontal base 101. One or more photographs 410 are conformally disposed on the front surface 201 of the display board 102. A shape of the one or more photographs 410 substantially corresponds with a shape of the display board 102.

According to an exemplary embodiment of the present invention, a width of the left side 202, the right side 203, the upper side 204 and the bottom side 301 of the display board 102 may be from about 1 cm to about 20 cm.

According to an exemplary embodiment of the present invention, the one or more photographs 410 may include one or more sports figures (see, e.g., FIGS. 1 and 4).

According to an exemplary embodiment of the present invention, the visual image display board may include one or more sports card display cases 120 coupled to the horizontal base.

According to an exemplary embodiment of the present invention, the one or more photographs might not overlap any of the left side 202, the right side 203, the upper side 204 and the bottom side 301 of the display board 102.

According to an exemplary embodiment of the present invention, the one or more photographs 410 may be attached to the front surface 201 of the display board 102 with an adhesive.

According to an exemplary embodiment of the present invention, the adhesive may be a spray adhesive configured to adhere to any of fabric, felt, cork and fibrous glass, flexible foam, latex, urethane, rigid foam, leather, rubber, EPDM rubber, metal, plastic, PVC, acrylic, nylon, glass, ceramic, gypsum board, fiberglass, masonry, paper, cardboard, polyolefins, elastomers, wood, hardboard, and vinyl.

Figure 8:
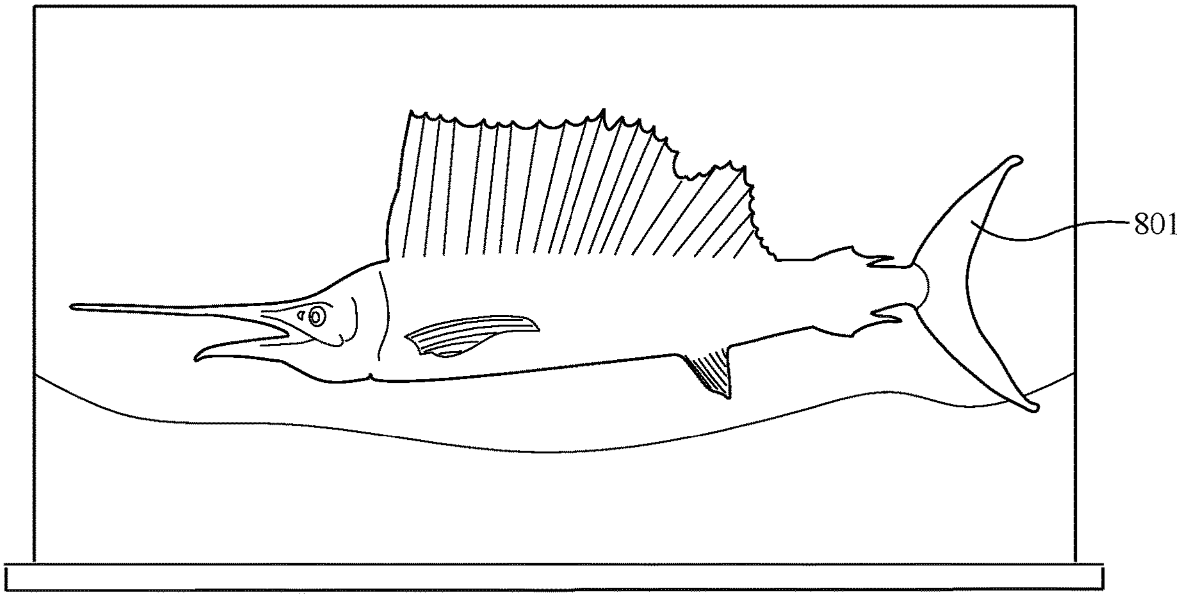
FIG. 8 illustrates a front view of a visual image display board including a disarticulated display board member according to an exemplary embodiment of the present invention.
Figure 9:
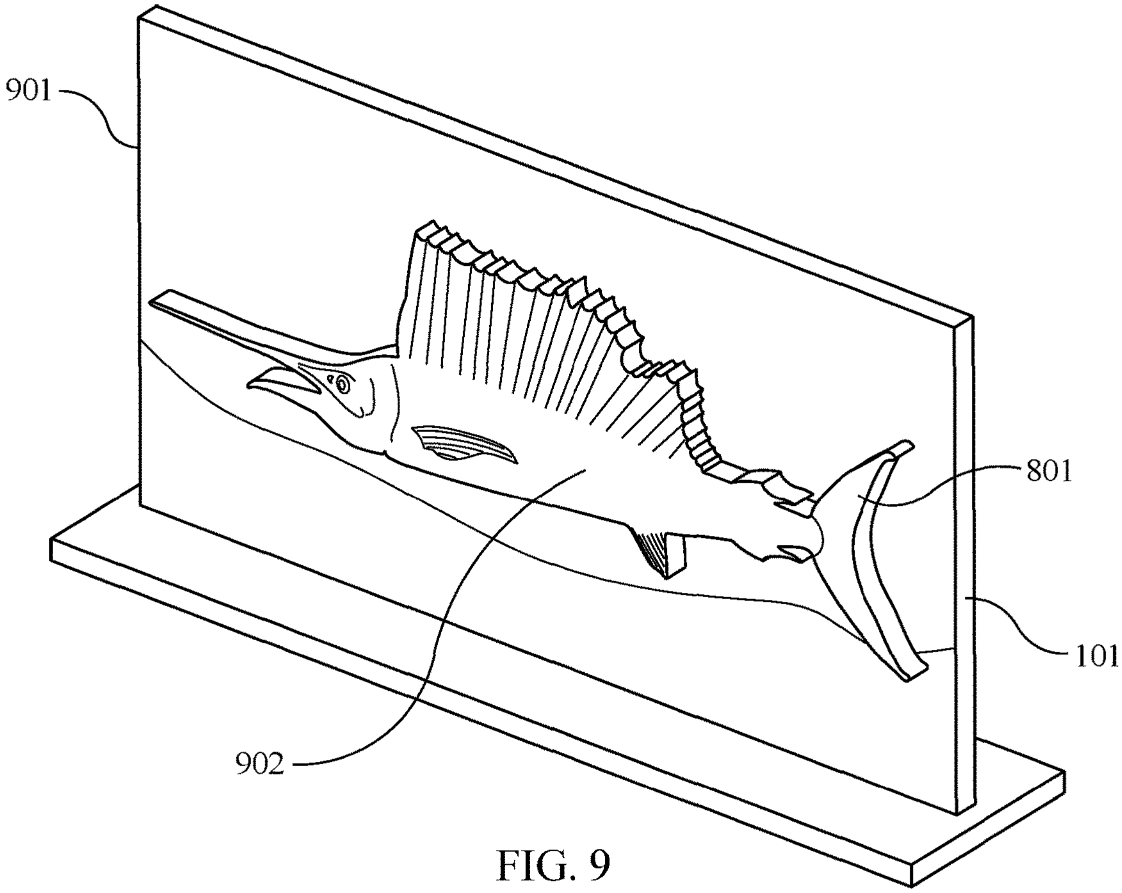
FIG. 9 illustrates side angled view of a visual image display board including a disarticulated display board member according to an exemplary embodiment of the present invention.
Figure 10:
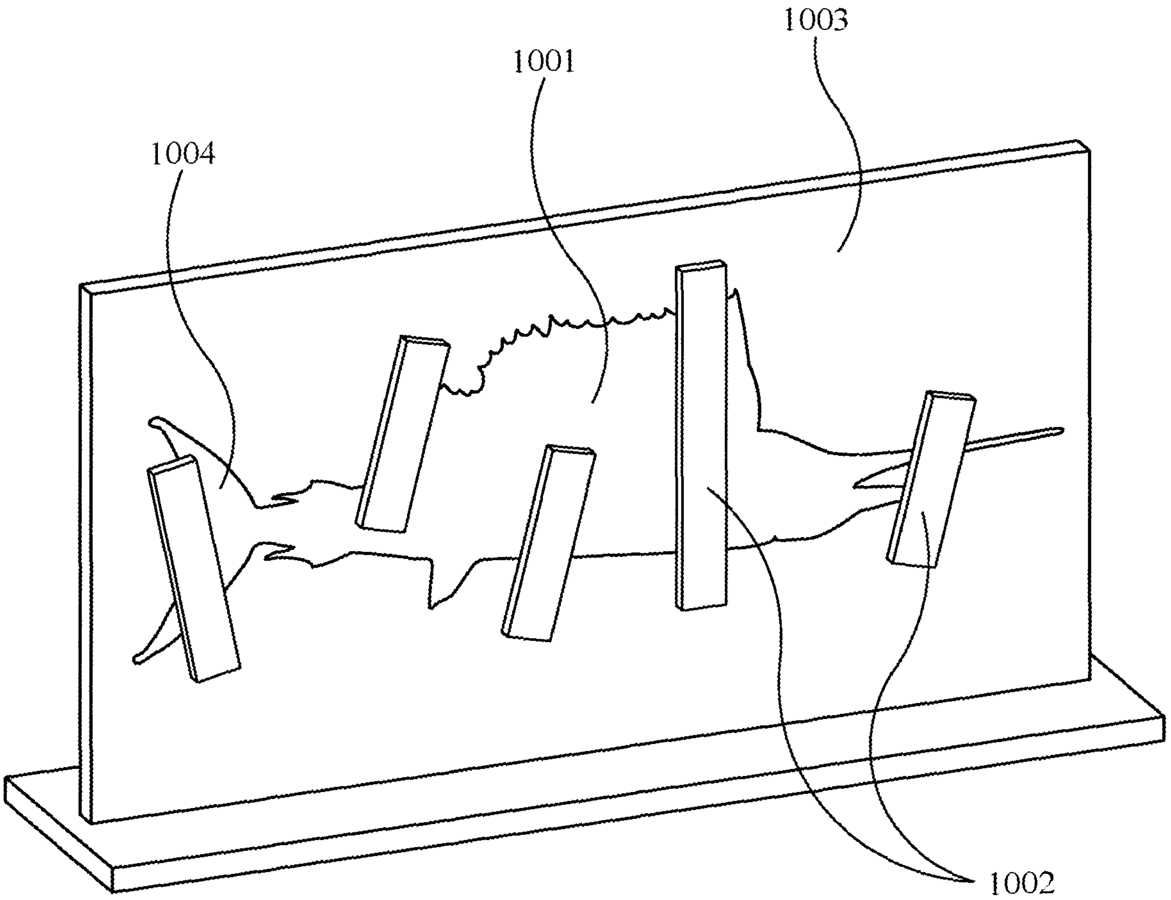
FIG. 10 illustrates a rear view of a visual image display board including a disarticulated display board member according to an exemplary embodiment of the present invention.
Figure 11:
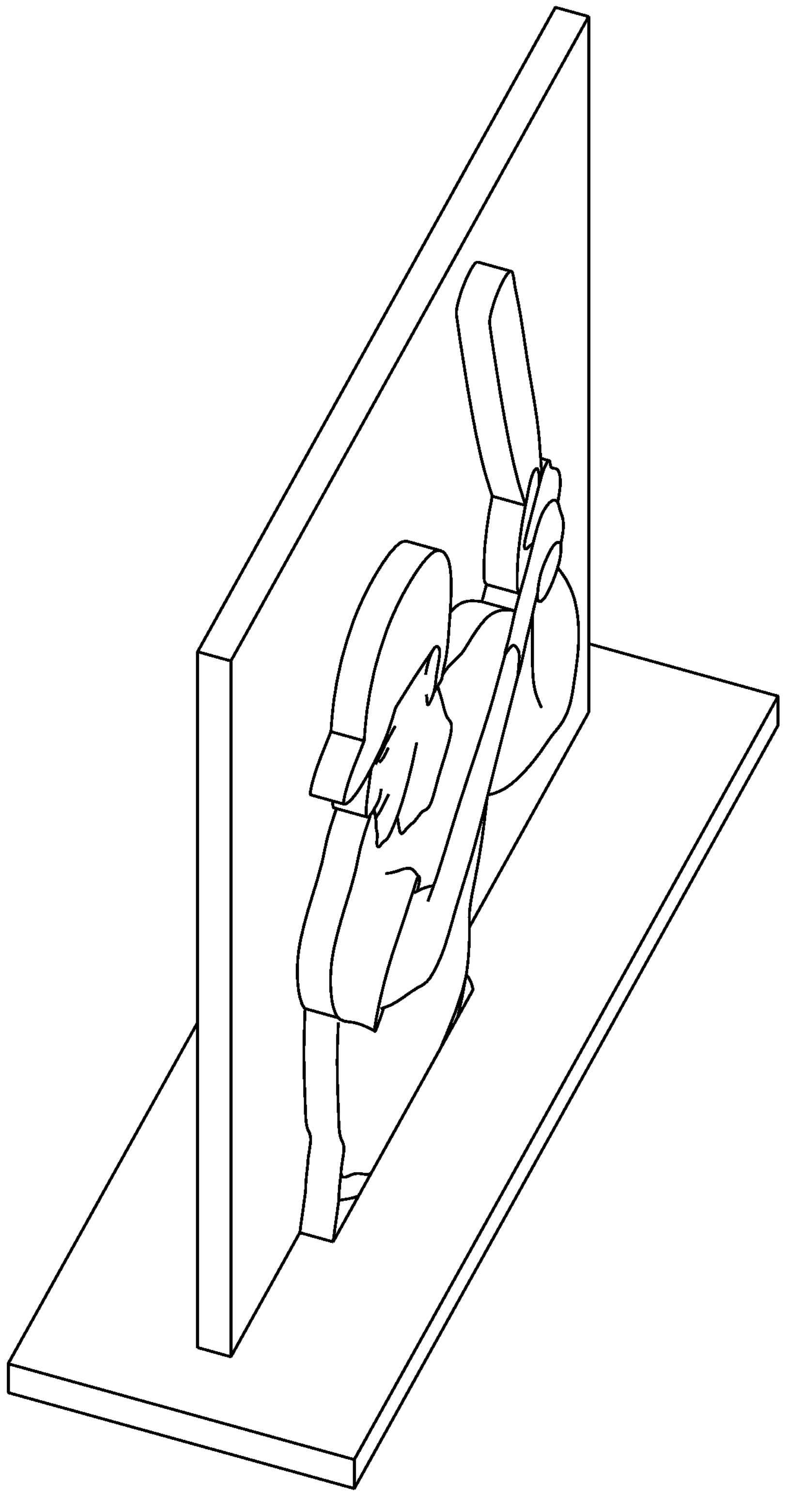
FIG. 11 illustrates a side view of a visual image display board including a disarticulated display board member according to an exemplary embodiment of the present invention.
Figure 12:
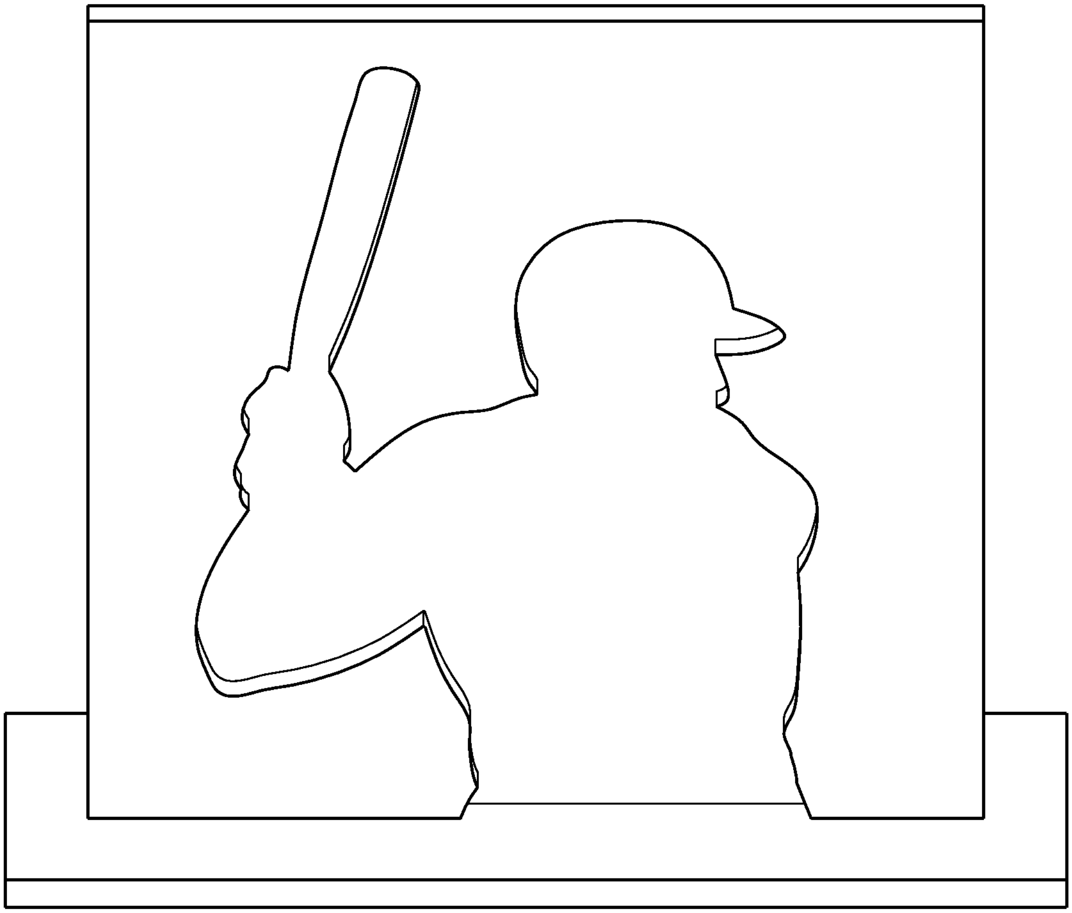
FIG. 12 illustrates a rear view of a visual image display board including a disarticulated display board member without support brackets according to an exemplary embodiment of the present invention.

FIG. 8 illustrates a front view of a visual image display board including a disarticulated display board member according to an exemplary embodiment of the present invention. FIG. 9 illustrates side angled view of a visual image display board including a disarticulated display board member according to an exemplary embodiment of the present invention. FIG. 10 illustrates a rear view of a visual image display board including a disarticulated display board member according to an exemplary embodiment of the present invention. FIG. 11 illustrates a side view of a visual image display board including a disarticulated display board member according to an exemplary embodiment of the present invention. FIG. 12 illustrates a rear view of a visual image display board including a disarticulated display board member without support brackets according to an exemplary embodiment of the present invention.

Referring to FIGS. 8 to 12, exemplary embodiments of the present invention provide a visual image display board including the horizontal base 101 and the display board 102. The display board includes the front surface 201, the back surface 302, the left side 202, the right side 203, the upper side 204 and the bottom side 301. The bottom side 301 of the display board 102 is coupled to the horizontal base 101. The adhesive layer 401 is disposed between the bottom side 301 of the display board 102 and the horizontal base 101. The adhesive layer 401 couples the display board 102 to the horizontal base 101. A disarticulated display board member 801 is disposed in front of the first front surface 201 of the display board 102. The disarticulated display board member 801 is formed of a separated portion 1001 of the display board 102.

According to an exemplary embodiment of the present invention, a first portion 901 of a visual image may be displayed on the display board 102. A second portion 902 of the visual image may be displayed on the disarticulated display board member 801.

According to an exemplary embodiment of the present invention, the visual image display board may include one or more support brackets 1002 coupled to the first back surface 1003 of the display board 102 and a second back surface 1004 of the disarticulated display board member 801.

According to an exemplary embodiment of the present invention, a width of the left side 202, the right side 203, the upper side 204 and the bottom side 301 of the display board 102 may be from about 1 cm to about 20 cm.

According to an exemplary embodiment of the present invention, the adhesive may be a spray adhesive configured to adhere to any of fabric, felt, cork and fibrous glass, flexible foam, latex, urethane, rigid foam, leather, rubber, EPDM rubber, metal, plastic, PVC, acrylic, nylon, glass, ceramic, gypsum board, fiberglass, masonry, paper, cardboard, polyolefins, elastomers, wood, hardboard, and vinyl.

According to an exemplary embodiment of the present invention, the first portion 901 of the visual image might not overlap of the left side 202, the right side 203, the upper side 204 and the bottom side 301 of the display board 102. The second portion 902 of the visual image might not overlap a second left side, a second right side, a second upper side or a second bottom side of the disarticulated display board member (see, e.g., FIGS. 11 and 12).

Figure 13:
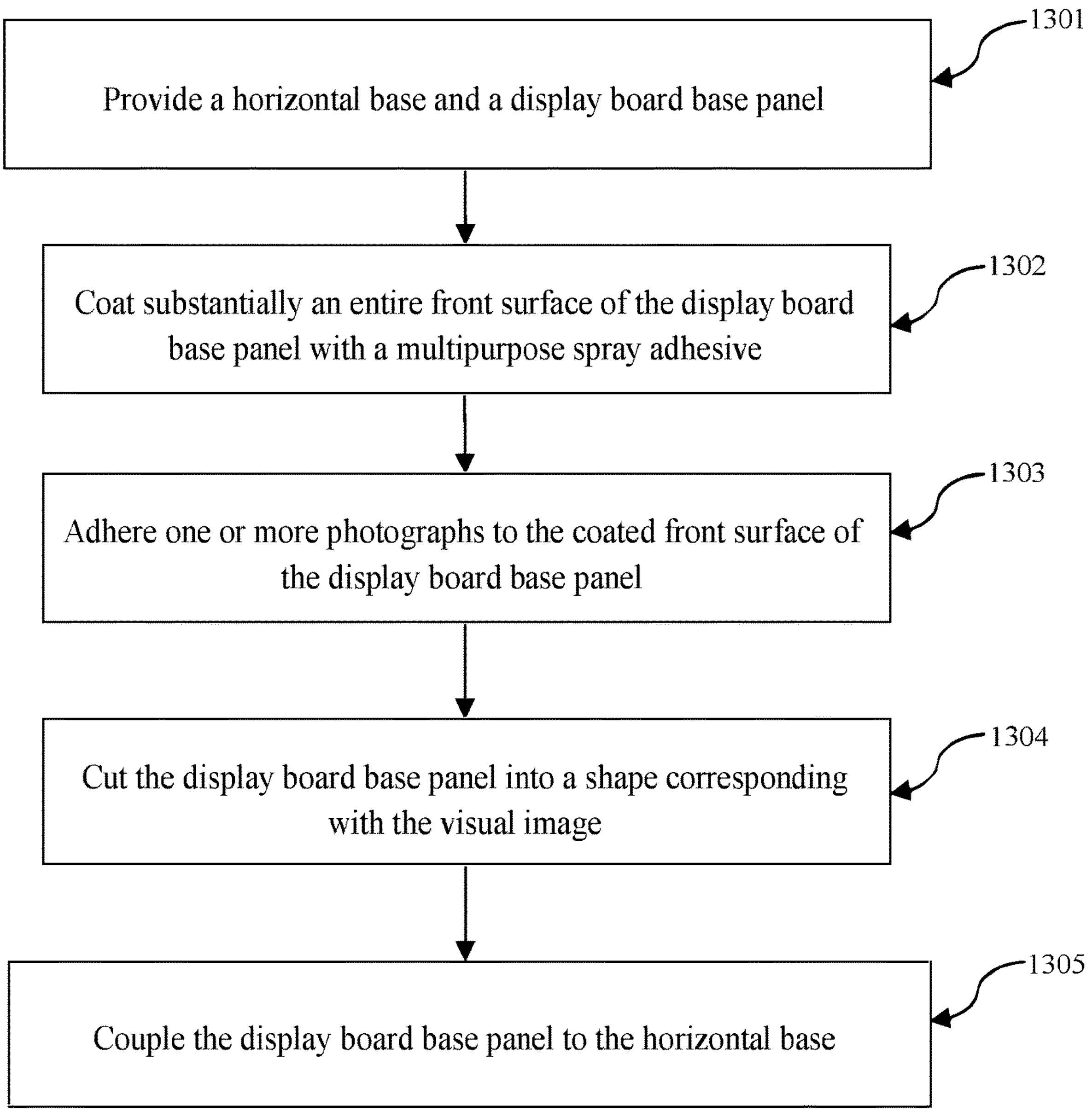
FIG. 13 is a flowchart illustrating a method of manufacturing a visual image display board according to an exemplary embodiment of the present invention.

FIG. 13 is a flowchart illustrating a method of manufacturing a visual image display board according to an exemplary embodiment of the present invention.

Referring to FIG. 13, exemplary embodiments of the present invention provide a method of manufacturing a visual image display board including providing a horizontal base and a display board base panel 1301; coating substantially an entire front surface of the display board base panel with a multipurpose spray adhesive 1302; adhering one or more photographs to the coated front surface of the display board base panel 1303; cutting the display board base panel into a shape corresponding with the visual image 1304; and coupling the display board base panel to the horizontal base 1305.

According to an exemplary embodiment of the present invention, the method of manufacturing the visual image display board may include removing a portion of the display board base panel including a portion of the adhered photograph; moving the removed portion of the display board base panel including the portion of the adhered photograph forward of the display board base panel, and attaching the removed portion of the display board base panel including the portion of the adhered photograph to the display board base panel.

According to an exemplary embodiment of the present invention, the multipurpose spray adhesive may be configured to adhere to any of fabric, felt, cork and fibrous glass, flexible foam, latex, urethane, rigid foam, leather, rubber, EPDM rubber, metal, plastic, PVC, acrylic, nylon, glass, ceramic, gypsum board, fiberglass, masonry, paper, cardboard, polyolefins, elastomers, wood, hardboard, and vinyl.

According to an exemplary embodiment of the present invention, the method of manufacturing the visual image display board may include coupling one or more sports card display cases to the horizontal base.

According to an exemplary embodiment of the present invention, the one or more photographs might not overlap any of a left, side, a right side, an upper side and a bottom side of the cut out display board base panel.

According to an exemplary embodiment of the present invention, the display board base panel may be coupled to the horizontal base using an adhesive.

According to an exemplary embodiment of the present invention, the adhesive may be configured to adhere to any of fabric, felt, cork and fibrous glass, flexible foam, latex, urethane, rigid foam, leather, rubber, EPDM rubber, metal, plastic, PVC, acrylic, nylon, glass, ceramic, gypsum board, fiberglass, masonry, paper, cardboard, polyolefins, elastomers, wood, hardboard, and vinyl.

Figure 14:
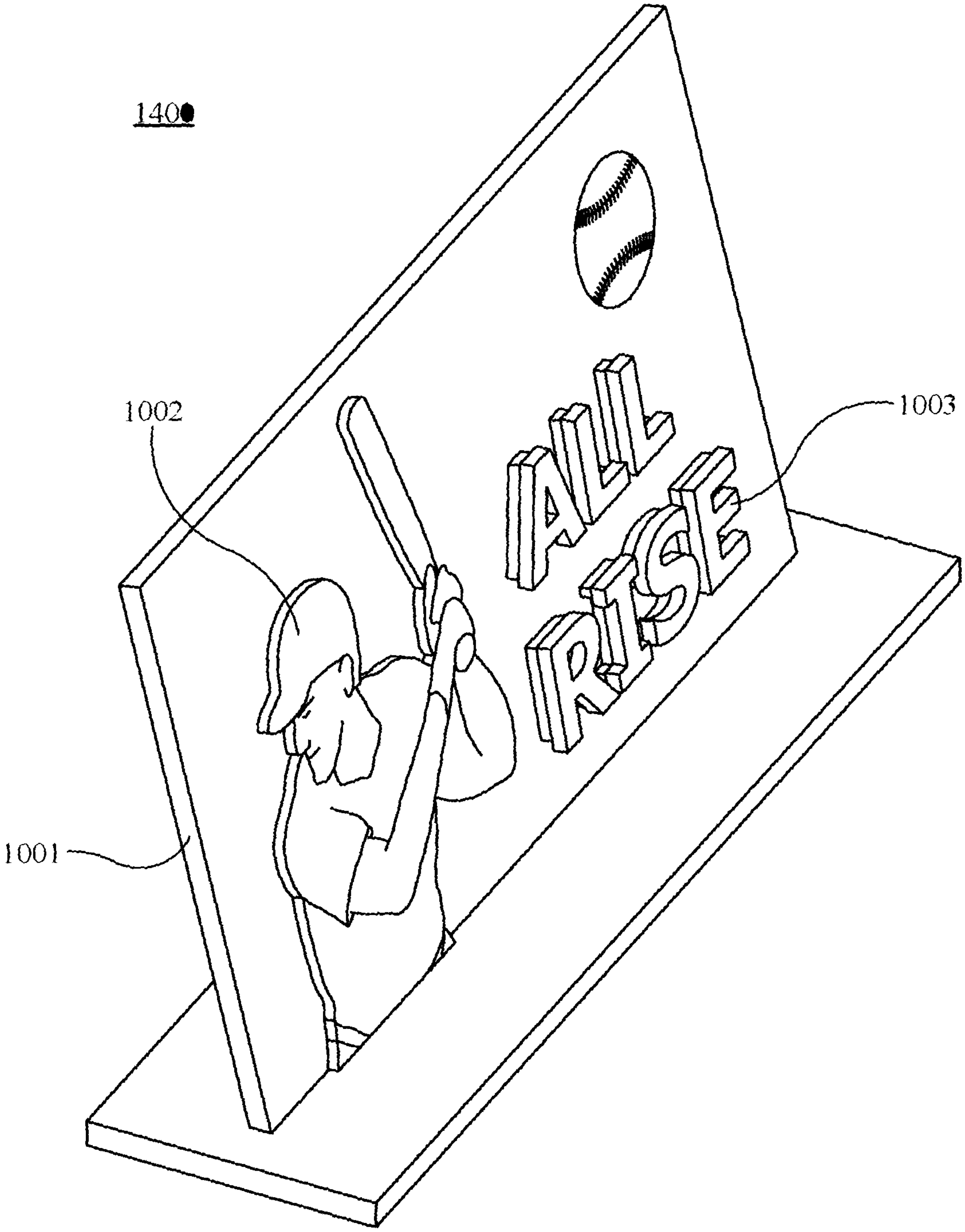
FIG. 14 illustrates an angled front view of a visual image display board including multiple disarticulated display board members having varying depths according to an exemplary embodiment of the present invention.
Figure 15:
FIG. 15 illustrates a front view of the visual image display board of FIG. 14.
Figure 16:
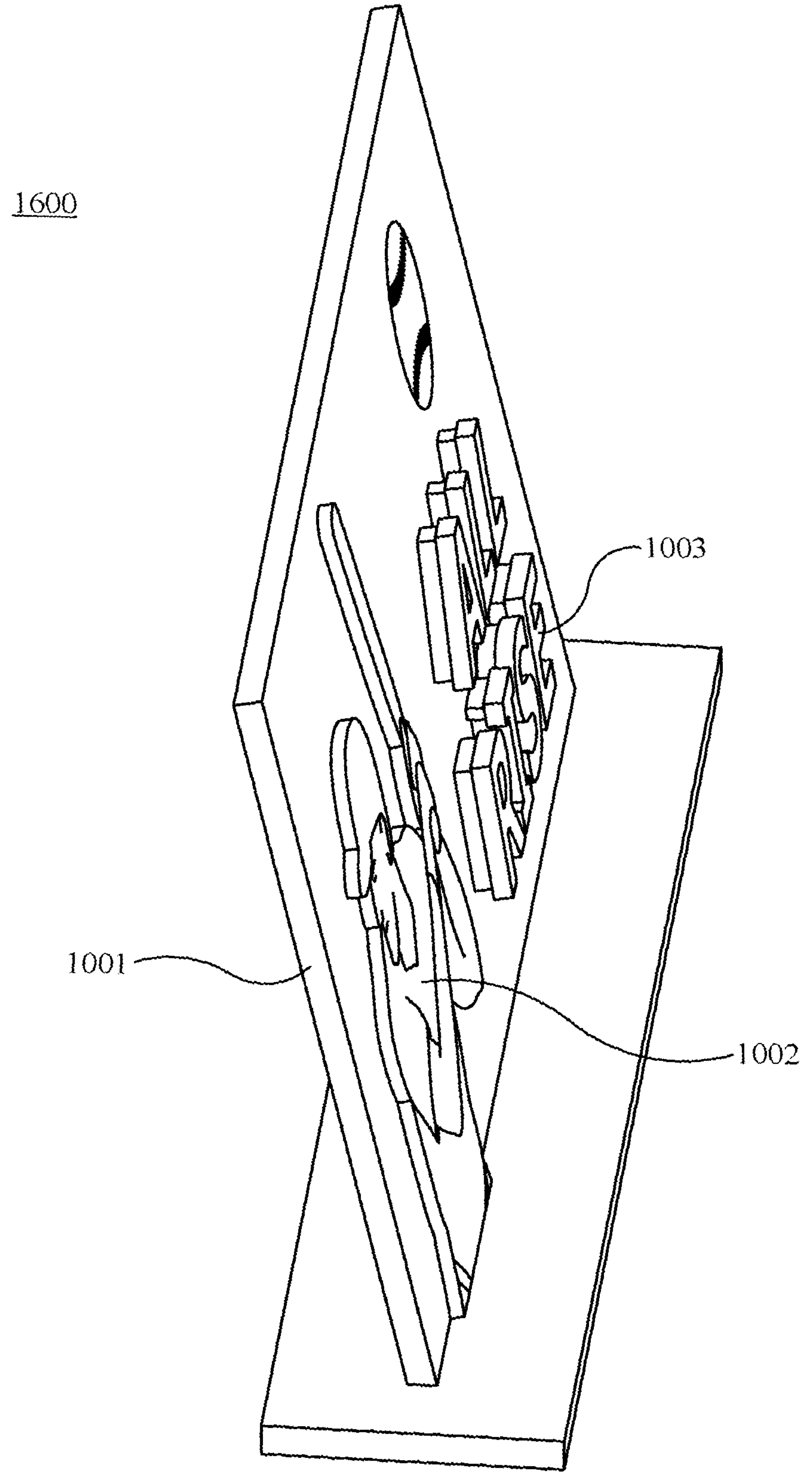
FIG. 16 illustrates a side view of a visual image display board including multiple disarticulated display board members having varying depths according to an exemplary embodiment of the present invention.

FIG. 14 illustrates an angled front view of a visual image display board including multiple disarticulated display board members having varying depths according to an exemplary embodiment of the present invention. FIG. 15 illustrates a front view of the visual image display board of FIG. 14. FIG. 16 illustrates a side view of a visual image display board including multiple disarticulated display board members having varying depths according to an exemplary embodiment of the present invention. The visual image display board described below with reference to FIGS. 1-16 is substantially the same as the visual image display board described above with reference to FIGS. 1-13, except for the addition of additional levels/depths of multiple disarticulated display board members.

Referring to FIGS. 1-16, a visual image display board (e.g., 1400 and 1600) according to an exemplary embodiment of the present invention may include multiple disarticulated display board members having varying depths. For example, multiple disarticulated display board members may be disposed in front of the first front surface 201 of the display board 102. The disarticulated display boards (e.g., 1400 and 1600) may include at least two disarticulated display board members disposed at two distinct depths in front of the first front surface 201 of the display board 102, which provides substantial visual depth (e.g., 3-tiers) to the displayed image.

As an example, the visual image display board may include a display board 1001, a first panel 1002 at a first depth in front of a front surface of the display board 1001 and a second panel 1003 at a second depth in front of a front surface of the first panel 1002. Exemplary embodiments of the present invention are not limited to a particular number of panels, and additional panels may be added to add a third or more depths to the display panel, as desired.

One or more support brackets 1002 may be used to couple the panels at different depths, as desired. Alternatively, a portion of a back surface of the second panel 1003 may be coupled to a front surface of the second panel 1002 to provide support to the second panel 1003.

The disclosures of each of the references, patents and published patent applications disclosed herein are each hereby incorporated by reference herein in their entireties.

In the event of a conflict between a definition herein and a definition incorporated by reference, the definition provided herein is intended.

Having described exemplary embodiments of the present invention, it is further noted that it is readily apparent to those of ordinary skill in the art that various modifications may be made without departing from the spirit and scope of the present invention.

What is claimed is:

1. A visual image display board, comprising:
a horizontal base;
a display board extending vertically from the horizontal base, wherein the display board defines a front surface;
a disarticulated display board member disposed at least partially in front of the front surface of the display board, wherein the disarticulated display board member is formed of a separated portion of the display board, wherein the disarticulated display board member defines a second front surface;
at least one photograph conformally disposed on the front surface of the display board;
at least one second photograph conformally disposed on the second front surface of the disarticulated display board member; and
at least one trading card display case extending vertically from the horizontal base.

2. The visual image display board of claim 1, wherein the at least one second photograph includes at least one sports figure.

3. The visual image display board of claim 2, wherein the at least one photograph includes a background image arranged behind the front surface of the disarticulated display board member.

4. The visual image display board of claim 1, wherein the at least one photograph is coupled with the front surface of the display board by an adhesive.

5. The visual image display board of claim 1, wherein the at least one second photograph is coupled with the second front surface of the disarticulated display board member by an adhesive.

6. The visual image display board of claim 4, wherein the adhesive is a spray adhesive configured to adhere to any of fabric, felt, cork and fibrous glass, flexible foam, latex, urethane, rigid foam, leather, rubber, EPDM rubber, metal, plastic, PVC, acrylic, nylon, glass, ceramic, gypsum board, fiberglass, masonry, paper, cardboard, polyolefins, elastomers, wood, hardboard, and vinyl.

7. The visual image display board of claim 5, wherein the adhesive is a spray adhesive configured to adhere to any of fabric, felt, cork and fibrous glass, flexible foam, latex, urethane, rigid foam, leather, rubber, EPDM rubber, metal, plastic, PVC, acrylic, nylon, glass, ceramic, gypsum board, fiberglass, masonry, paper, cardboard, polyolefins, elastomers, wood, hardboard, and vinyl.

8. The visual image display board of claim 1, further including:
a back surface defined by the display board;
a second back surface defined by the disarticulated display board member; and
at least one support bracket couped to the back surface of the display board and the second back surface of the disarticulated display board member, wherein the at least one support bracket is configured to support the disarticulated display board member with respect to the display board.

9. The visual image display board of claim 1, wherein the at least one photograph represents a first portion of a continuous image, and wherein the at least one second photograph represents a second portion of the continuous image.

10. The visual image display board of claim 1, wherein the at least one trading card display case includes a plurality of trading card display cases extending vertically from the horizontal base.

* * * * *